(No Model.) 2 Sheets—Sheet 1.
W. E. SPARKS.
LOCK.
No. 502,937. Patented Aug. 8, 1893.
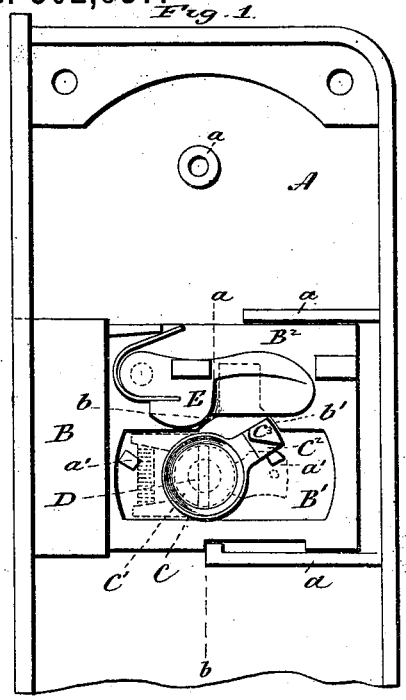
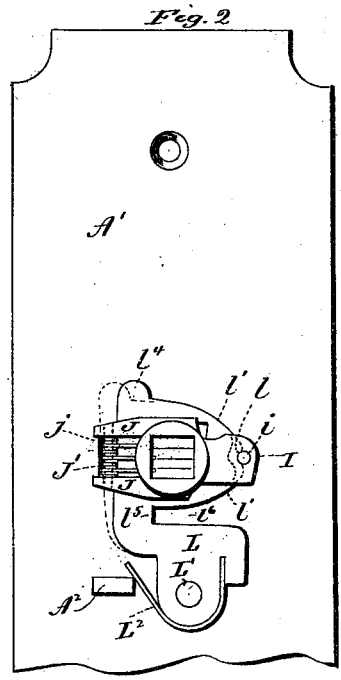
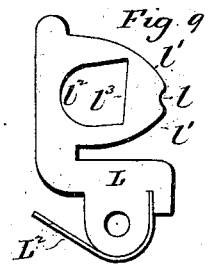
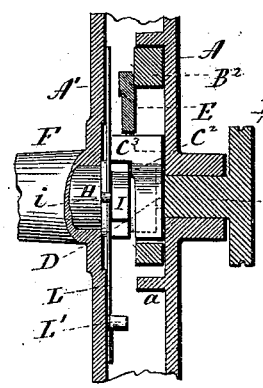
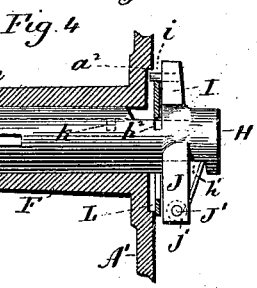
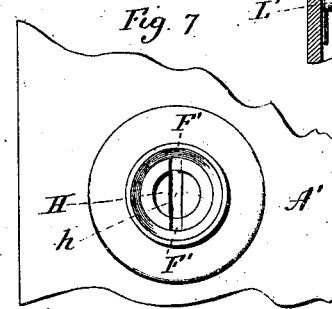
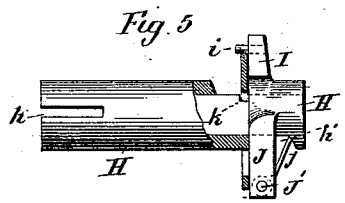
Witnesses.
William E. Sparks
Inventor
By Atty Earle Seymour (No Model.) 2 Sheets—Sheet 2.
W. E. SPARKS.
LOCK.
No. 502,937. Patented Aug. 8, 1893.
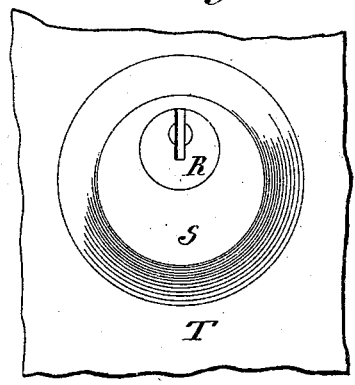
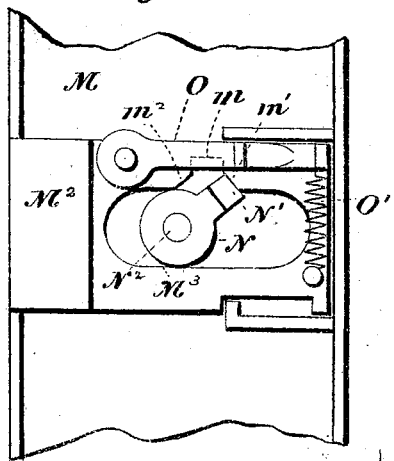
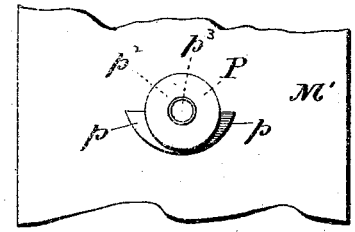
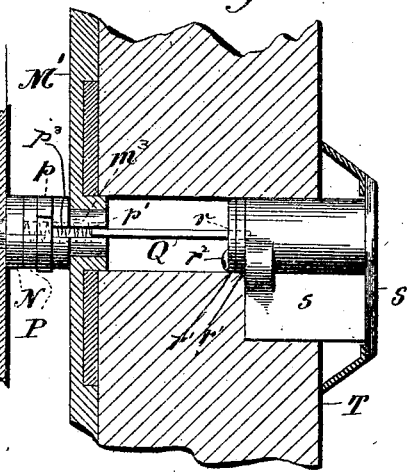
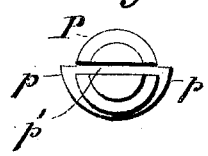
Witnesses
William E. Sparks,
Inventor
By Atty's
Earle & Seymour

UNITED STATES PATENT OFFICE.

WILLIAM E. SPARKS, OF NEW HAVEN, CONNECTICUT, ASSIGNOR TO THE SARGENT & COMPANY, OF SAME PLACE.

LOCK.

SPECIFICATION forming part of Letters Patent No. 502,937, dated August 8, 1893.

Application filed March 27, 1893. Serial No. 467,734. (No model.)

*To all whom it may concern:*

Be it known that I, WILLIAM E. SPARKS, of New Haven, in the county of New Haven and State of Connecticut, have invented a new Improvement in Locks; and I do hereby declare the following, when taken in connection with accompanying drawings and the letters of reference marked thereon, to be a full, clear, and exact description of the same, and which said drawings constitute part of this specification, and represent, in—

Figure 1, an inside broken view of one form which a lock constructed in accordance with my invention may assume, showing the bolt, the spring-guard therefor, and the bitted hub of the knob in full lines, and the cylinder and oppositely projecting arms of the key-mechanism by broken lines; Fig. 2, a reverse view of the cover of the lock-case, showing the inner end of the cylinder of the key-mechanism, and the locking-plate, the former being shown in its locked position by full lines, and in its unlocked position by broken lines; Fig. 3, a broken view on the line a—b of Fig. 1, showing the case, its cover, the bolt and the knob in vertical section, and the key-mechanism in elevation; Fig. 4, a detached broken view showing the housing of the key-mechanism in vertical section and the key-cylinder in elevation; Fig. 5, a detached broken view of the key-cylinder; Fig. 6, a view of the key-cylinder in transverse section to show its tumblers; Fig. 7, a broken view of the cover of the case in front elevation, showing the outer end of the housing of the key-mechanism; Fig. 8, a detached view in inside elevation of the key for the key-mechanism shown in the preceding figures; Fig. 9, a detached view of the locking-plate of the said mechanism; Fig. 10, a view in inside elevation of the case of a modified form which my improved lock may assume, showing the bolt, the guard therefor, and the bitted hub of the knob; Fig. 11, a broken view in inside elevation of the cover of the said lock, showing the roll-back which is connected with its key-mechanism; Fig. 12, a broken view of the said lock in vertical central section as applied to a door; Fig. 13, a broken view showing the key-mechanism in front elevation; Fig. 14, a detached front view of the roll-back of this lock; Fig. 15, a detached view of its key.

My invention relates to an improvement in that class of door-locks adapted to be operated from both sides of the door to which they are applied, and generally furnished with a knob and a key-mechanism, by means of which the lcok is locked and unlocked from the inside and outside of the door, respectively. Ordinarily locks of this kind have their knobs and key-mechanisms coupled together, so that in order to operate the bolt by the knob, the same has to be pulled out to disconnect it from the key-mechanism before it can be rotated. The construction just described is not only complicated and expensive, but also inconvenient and objectionable, because any one not understanding that the knob cannot be operated without first pulling it out, must fail to operate the lock. Locks of the same class have also been made with their knobs and key-mechanisms entirely independent of each other in their connection with the bolt. In such locks it is not necessary to pull out the knob before operating the bolt by it, but such locks are also expensive to construct.

The object of the present invention is to produce a dead-lock of the type described, of simple and inexpensive construction, dispensing with pulling out the knob for operating the bolt, and requiring only a quarter turn of the knob or key for throwing the bolt in either direction.

A further object of my invention is to produce a simple, durable and effective key-mechanism of the type in which the tumblers are adapted to be operated by notches in the end of a flat key.

With these ends in view, my invention consists in a lock having certain details of construction and combinations of parts as will be hereinafter described, and pointed out in the claims.

As shown in Figs. 1 to 8 inclusive of the drawings, the mechanism of my improved lock is located in an oblong case A, having a cover A', both the said case and cover being of ordinary construction. The bolt B, located in the said case and guided at its rear end by transverse flanges *a a*, formed in the bottom thereof, is also of ordinary construction, and formed with a longitudinal slot or opening B', having an offsetting notch B², and with two locking faces or talons $b$ $b'$. The said opening receives a hub C, having a concentric socket C', and furnished with a bit C², the outer end of which is cut away to form a finger C³, the said hub being rigidly secured to the inner end of the stem D, of the knob D', as shown by Figs. 1 and 3 of the drawings. Lugs $a'$ $a'$ located in the bottom of the case A, on opposite sides of the said hub, are arranged in position to be engaged by the bit thereof, and limit the swinging movement of the same. The said bit of the hub engages with the locking faces $b$ and $b'$ before mentioned, to positively lock the bolt in its open and closed positions respectively, the bit passing through the notch B² in the bolt while being swung between the said locking faces.

The described engagement of the bitted hub with the bolt, characterizes my improved lock as a dead-lock. By preference, I employ a spring-actuated spring-dog or guard E, for engaging with the bit of the hub to securely hold the same in its two positions against displacement by jarring, or otherwise, the said guard being pivoted to the bolt above the outer end of the slot or opening therein. I would have it understood, however, that I do not limit myself to the use of such a guard.

The key-mechanism of this lock is mounted in the cover A' of the case, the said cover being thereto provided upon its outer face with a cylindrical housing F, the outer end of which is formed with an inwardly projecting annular flange $f$, located at a right angle to the length of the housing. Two corresponding notches F' F' located opposite each other in a vertical plane in the said flange $f$, together form a slot for admitting the key G to the key-mechanism, the said key being formed at its end with operating notches $g$, and having notches $g'$ $g'$ formed in its edges at opposite points therein, to take into the said flange $f$, and thus permit the key to be turned. A chambered cylinder H, located within the said housing and rotatable therein, is constructed at its outer end with a deep transverse slot $h$, adapting it to receive the key. Normally the slot $h$ stands in line with the notches F' F' formed in the flange $f$, of the housing F, as before stated. Two oppositely extending projections located near the inner end of the said cylinder, co-operate with the finger C³ of the bit C² of the hub C, attached to the stem D of the knob D', for throwing the bolt B of the lock in and out, the extreme inner end of the cylinder fitting into the socket C', formed in the said hub C, which thus affords a bearing for the inner end of the cylinder. The oppositely extending projections just mentioned, comprise an arm I, furnished upon its outer face with a locking-pin $i$, and a bifurcated arm J, the two members of which carry at their outer ends a pin J', upon which the tumbler-springs $j$, are supported. The respective ends of the said springs are engaged with a notch $h'$, formed in the inner end H', of the cylinder, and with the inner ends of the respective tumblers K, located within the cylinder, and adapted to be moved longitudinally therein by the end thrust of the key G, the said springs exerting a constant effort to move the tumblers outward in the cylinder. A transverse slot $h^2$ formed in the cylinder in the plane of the said arms I and J, and directly opposite the locking pin $i$ before mentioned, is provided for exposing the tumblers K to the action of the locking-plate L, the notches $k$ of the tumblers being brought into line with the said transverse slot $h^2$ when the tumblers are thrust inward by means of a suitable key, such as the key G. The said notches in the tumblers are normally out of line, being dodged in the usual manner, in conformity with the notches in the key designed to co-operate with the tumblers. The locking-plate L, before mentioned, is hung upon a stud L', projecting from the inner face of the cover A' of the lock, and provided with a spring L², engaging with a lug A², formed upon the said cover, and arranged to exert a constant effort to move the plate toward the said pin $i$, which is normally located in a shallow notch $l$, formed in one edge of the plate between two oppositely inclined cam-surfaces $l'$ $l'$. The said plate is constructed with a D-shaped opening $l^2$, through which the cylinder H, passes, the plate being located, when the key mechanism under description is assembled, in the same plane with the transverse slot $h^2$ of the cylinder, with the straight locking edge $l^3$ of the said opening standing directly in front of the said slot, which is normally closed by the tumblers, the same being prevented from being cut and worn by the said edge by the action of the spring L², which constantly tends to move the edge away from the tumblers. In this adjustment of the parts, the cylinder is locked on the one hand by the tumblers, and on the other by the locking-pin. When, however, the notches in the tumblers are brought into line by means of a proper key, and the cylinder is turned, the pin will ride out of the notch $l$ in the plate, and force the same inward into the notches, whereby sufficient clearance is secured for the rotation of the cylinder in either direction for a quarter turn, beyond which it cannot go, being stopped by the engagement of the pin with the stop $l^4$ of the plate, or with the bottom wall $l^5$ of a clearance slot $l^6$ formed therein. When the cylinder is thus rotated, the pin $i$ rides along upon one of the two cammed edges $l'$ $l'$ of the plate, clearance for the pin being provided for by an annular recess $a^2$ formed in the inner face of the cover A' of the case. When the cylinder is rotated, as described, one or the other of its oppositely extending arms or projections I J, engages with the finger C³ of the bit C² of the hub C, whereby the bit, and hence the bolt B, is thrown in or out as the case may be, the knob D' also turning. It will be noted that only a quarter turn is required for operating the bolt by the key. The key cannot now be removed from the lock except the cylinder be correspondingly reversely rotated so as to bring its slot $h$, into line with the notches $F'$ $F'$ of the flange of the housing F, at which time the projections I J at the inner end of the cylinder will be in line with the length of the bolt B, for the said slot and projections are arranged at a right angle to each other. This movement of the cylinder brings the locking-pin $i$ into line with the locking-notch $l$ of the locking plate L, whereby the locking edge $l^3$ of the plate is allowed to move sufficiently away from the cylinder to permit the tumblers therein to return to their normal positions, in which they guard the transverse slot $h^2$ thereof.

What I particularly wish to emphasize is that the key cannot be removed from the lock until the key-cylinder has been rotated and locked in a position in which its oppositely extending projections are in line with the bolt, and in position to permit the bitted hub of the knob to be swung back and forth for the operation of the bolt, without in any wise interfering with the key mechanism. I thus secure the independent operation of the bolt by the knob, and by the key-mechanism, by a simple construction, which avoids pulling out the knob, and which avoids the use of two bitted hubs arranged to operate in recesses formed in the opposite faces of a suitable bolt. I am enabled, moreover, to throw the bolt either by the knob or by the key-mechanism, by a quarter turn, giving my improved lock the convenience in that respect of a latch-lock, although my lock is in fact a dead lock.

In the construction shown by Figs 10 to 15 inclusive of the drawings, I have shown a lock having a key-mechanism of the pin type, in which the key cannot be withdrawn from its cylinder, except when the same is in a certain position with respect to the case which contains the pins. The main case M, of this lock is furnished with a cover M', both the said case and cover being of ordinary construction. The bolt $M^2$ is also of ordinary construction, and has formed in it a long slot or opening $M^3$, having a clearance slot $m$, leading out of its upper edge, and having two locking faces $m'$ $m^2$ located at the open inner end of the said slot. A hub N, having a bit N', is located within the slot $M^3$, being secured to the projecting inner end of the stem $N^2$, of the knob $N^3$. A guard O, pivotally attached to the bolt in position to engage with the bit N' of the hub N is held in engagement with the said bit by a spiral spring O'. The construction thus far described, does not materially differ from the construction of the lock shown in the other figures, independent of the key-mechanism of the same. The cover M', aforesaid is provided with a small hub or sleeve $m^3$, which receives a roll-back P, having oppositely extending projections $p$ $p$, which alternately engage with the bit N' of the hub N, and correspond in function to the projections I and J of the key mechanism of the other lock, so far as the operation of the bolt is concerned. The inner end of this roll-back bears directly against the hub, as shown in Fig. 12 of the drawings. The outer end of the roll-back has a transverse slot $p'$, which receives the inner end of a coupling-bar Q, the outer end of which is inserted into a slot $r$, formed in two disks $r'$ $r'$ attached by a screw $r^2$ to the inner end of the cylinder R, of a key-mechanism of the pin type, the said cylinder being mounted in a case S, which is secured to the door T, in the ordinary manner. The central opening $p^2$ formed in the said hub, is designed to receive a spiral spring $p^3$, which operates to keep the coupling-bar in place, and which affords compensation for variation in the thickness of doors to which the lock may be applied. This key-mechanism is of ordinary construction, and does not need detailed description, and it need only be pointed out that it is constructed and arranged with reference to the roll-back P, so that the key cannot be removed except when the hub stands with its projections $p$ $p$ in line with the bolt, in which positions they clear the bit N' of the hub N, permitting the latter to be operated by the knob without disturbing the roll-back, or without pulling the knob out to clear the same. This lock also requires only a quarter turn of the knob or key for the operation of the bolt, which is a dead bolt, and possesses the advantages recited for the other construction. My object in showing this construction is, to make it clear that in constructing my improved lock, I am not limited to using a key-mechanism operated by the end thrust of the key, as specifically described.

In view of the foregoing, I would have it understood that I do not limit myself to the exact construction herein shown and described, but hold myself at liberty to make such changes and alterations as fairly fall within the spirit and scope of my invention.

Having fully described my invention, what I claim as new, and desire to secure by Letters Patent, is—

1. In a lock, the combination with the bolt thereof, of a rotatable hub having a bit arranged to engage with the bolt to throw the same and lock it in both of its positions, and a key-mechanism having two projections constructed to alternately engage with the said bit to act through the same in throwing the bolt, and also having means for locking the said projections in position to clear the bit, substantially as set forth.

2. In a lock, the combination with the bolt thereof, of a rotatable hub having a bit arranged to engage with the bolt to throw the same and lock it in both of its positions, and a key-mechanism having two projections constructed and arranged to alternately engage with the said bit to act through the same in throwing the bolt by a quarter turn in either direction, and also having means constructed to normally lock the said projections in position to clear the said bit and to retain the key until the said projections have been brought into such position before it can be removed from the lock, substantially as described.

3. In a lock, the combination with the bolt thereof, of a knob having a hub furnished with a bit which engages with the bolt to throw the same, and a key-mechanism including a cylinder, furnished at its inner end with two oppositely extending projections, arranged to alternately engage with the said bit for throwing the bolt, and also including means for normally holding the said projections in line with the length of the bolt so as to clear the said bit, substantially as described.

4. In a lock, the combination with the bolt thereof, of a knob having a recessed hub, and furnished with a bit which engages the bolt to throw the same, and a key-mechanism including a cylinder, having its inner end adapted to fit into the recess in the said hub, and furnished with two oppositely extending projections arranged to alternately engage with the bit for throwing the bolt, and also including means for normally holding the said projections in line with the length of the bolt so as to clear the said bit, substantially as described.

5. In a key-mechanism, the combination with a key-cylinder constructed at its inner end with an arm having a locking pin, and with a transverse slot located in line with the said pin, of tumblers located in the said cylinder, and having their inner ends notched and exposed through the said slot, and a spring-actuated pivotal locking plate having a D-shaped opening through which the said cylinder passes, and constructed with a centrally notched double cammed edge located opposite the straight edge of the said opening, the said plate being located in the plane of the slot in the cylinder with its straight edge normally standing in front of the said slot, and with its notch normally receiving the said pin, substantially as described.

In testimony whereof I have signed this specification in the presence of two subscribing witnesses.

WILLIAM E. SPARKS.

Witnesses:
 WILLIAM S. COOKE,
 CHARLES L. BALDWIN.